United States Patent [19]

Schulze

[11] 4,352,180
[45] Sep. 28, 1982

[54] DIGITAL TIME-DIVISION MULTIPLEX TELECOMMUNICATION SYSTEM

[76] Inventor: Elmar Schulze, No. 7, Wermuthweg, 1000 Berlin 47, Fed. Rep. of Germany

[21] Appl. No.: 141,850

[22] Filed: Apr. 21, 1980

[30] Foreign Application Priority Data

Apr. 27, 1979 [DE] Fed. Rep. of Germany ....... 2917675

[51] Int. Cl.³ .............................................. H04J 3/00
[52] U.S. Cl. ........................................ 370/58; 370/95; 370/100
[58] Field of Search .................... 179/7 R, 9, 10, 16 F, 179/17 C; 370/71, 89, 93, 95, 100, 53, 54, 58, 60, 62; 455/2, 32, 34

[56] References Cited

U.S. PATENT DOCUMENTS

| | | | |
|---|---|---|---|
| 3,634,627 | 1/1972 | Velentini | 455/34 |
| 3,781,480 | 12/1973 | Roge | 179/16 F |
| 3,995,117 | 11/1976 | Fallon et al. | 179/7 R |
| 4,124,776 | 11/1978 | Nocker | 370/89 |
| 4,125,808 | 11/1978 | Graham | 455/32 |
| 4,140,877 | 2/1979 | Joslow et al. | 370/95 |
| 4,161,786 | 7/1979 | Hopkins et al. | 370/95 |

Primary Examiner—Benedict V. Safourek
Attorney, Agent, or Firm—John C. Smith, Jr.

[57] ABSTRACT

A digital time-division multiplex telecommunication system of flexible network configuration, including line, branch, ring, and star networks. Decentralized control of channel assignment is provided. Branching nodes coupling subscriber stations into bidirectional transmission lines are provided. The branching nodes comprise decentralized control means for confining communication connections between two subscribers to occupy transmission channels only on those portions of the transmission lines between the two subscribers. Thus, channels used by the two subscribers are free for use between subscribers whose connection path does not overlay that of the two subscribers.

9 Claims, 21 Drawing Figures

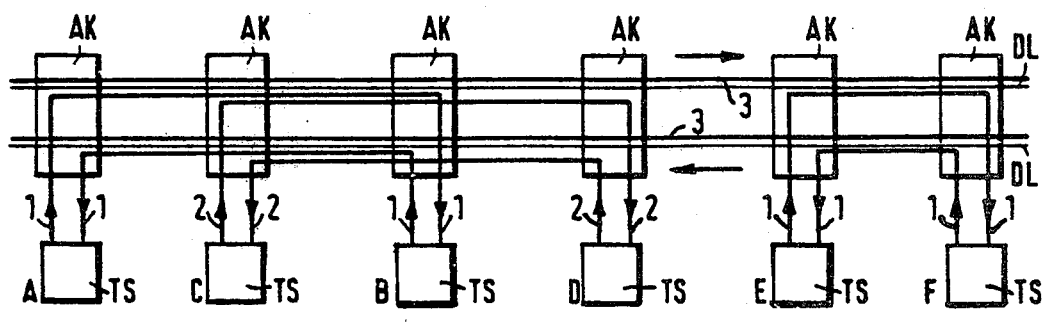
Fig.1
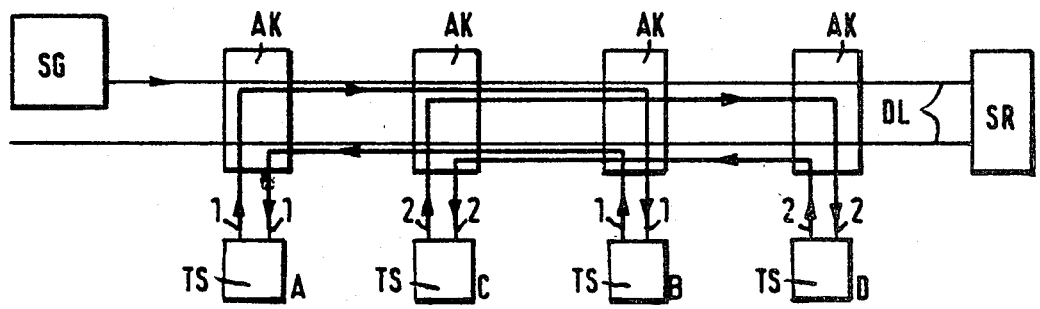
Fig.2
Fig.3
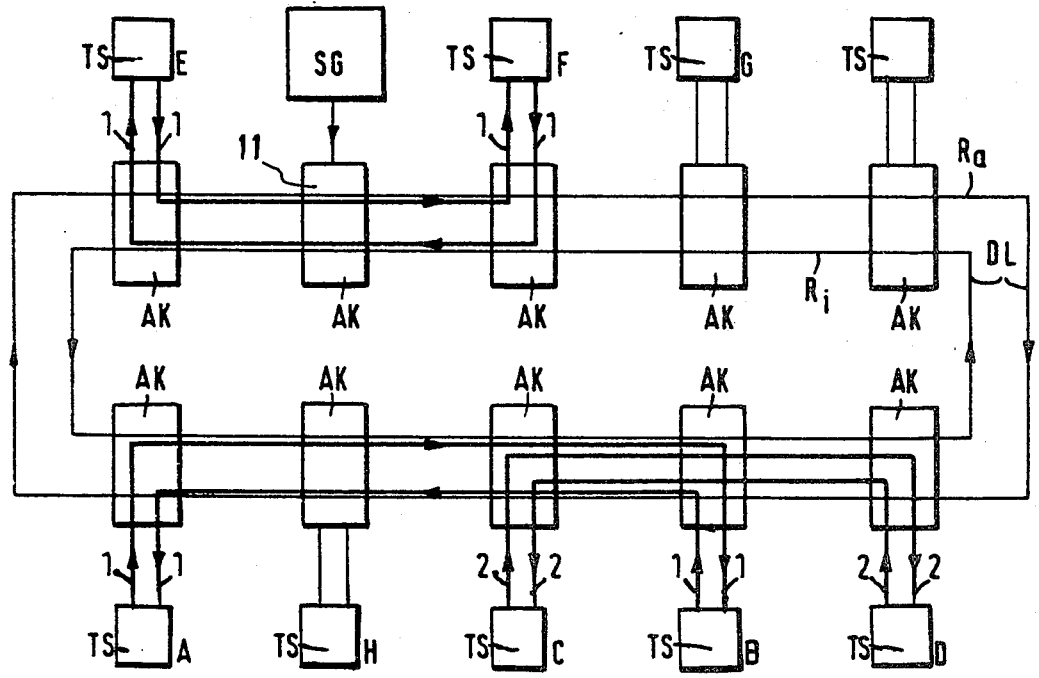

SMUX; PMUX; for 1 bit of the TS word

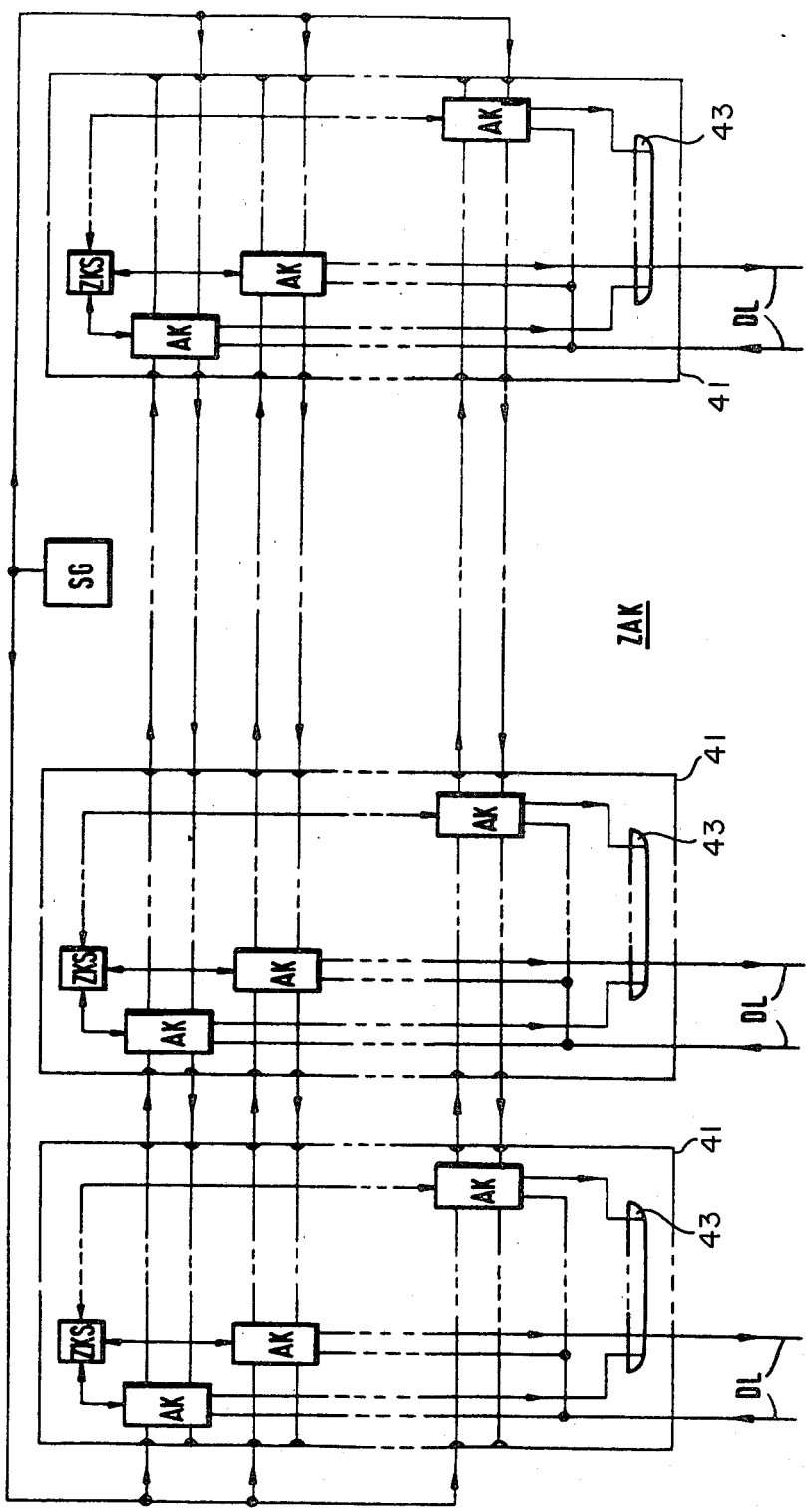

FIG. 14
Time Frame Structure
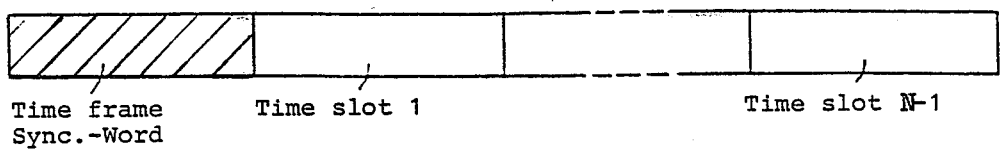
Time frame Sync.-Word | Time slot 1 | Time slot N-1
Time slot formats
free Time slot
Call
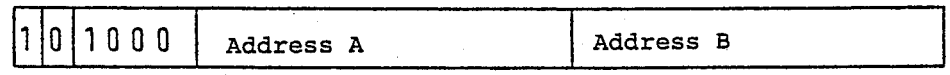
Call answer (free subscriber)
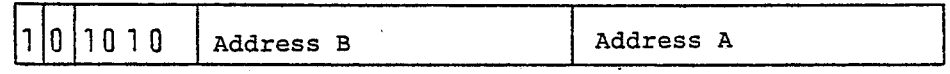
Call answer (occupied subscriber)
Connection end
Call with subscriber counting
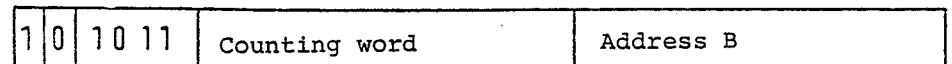
↑ ↑ ↑ Time slot identification
    └── Signalling/Message identification
└───── Sync.-Bit
Data (message)

DIGITAL TIME-DIVISION MULTIPLEX TELECOMMUNICATION SYSTEM

BACKGROUND OF THE INVENTION

This invention relates to a digital time-division multiplex telecommunication system.

In German Offenlegungsschrift No. 23 24 854 a method for directional message transmission in a network with multiple branching has been disclosed in which messages are to be sent only in those time intervals in which simultaneously no other subscriber device is sending. The message flows are to be directed by virtue of the fact that during the establishment of a connection, when the coded call numbers of the calling subscriber which are sent out in both directions into the whole network containing bidirectional two-wire transmission lines pass through network nodes, a marker is added to each of these call numbers and from the totality of these markers a routing address is formed which allows the path travelled by the call number to be recognized clearly. One of these calls which are sent out distributed over the whole network, that is the one arriving at the receiving location of the subscriber called, then possesses the routing address which is "correct" for the desired connection and which makes it possible to return a directed call acknowledgment. The routing addresses, including a location marker for the location of the subscriber device between two nodes, are mutually communicated to the subscriber devices and must be sent in the time interval channels, together with the messages to be transmitted, during the whole period of a connection. In addition, the network nodes must be equipped with systems by means of which the paths of the routing addresses significant to these nodes can be detected and used to derive control signals which cause the respective message blocks to be transferred into the associated network branch.

Although a directional message transmission by means of the routing addresses and location markers added to the message blocks needs to take place only via those network branches which are absolutely required for the connection between two subscriber devices, this known method does not make it possible to utilize a time interval channel in these network branches for several simultaneous connections which do not overlap with respect to these connections and this time interval channel and thus to reduce the number of channels or to increase the number of subscriber stations connected. Any problems arising in this connection are eliminated with this routing address method by the fact that—as already mentioned above—messages can be sent only in those time intervals in which simultaneously no other subscriber unit is sending. Since furthermore the message blocks to be exchanged must here also include the routing addresses and location markers, the time interval channels are not particularly well utilized for useful information.

With respect to utilizing a channel for useful information, telecommunication systems working with time-position addressing are more advantageous. Such a message transmission system, providing multiple access by the connected subscribers, is disclosed, for example, in German Offenlegungsschrift No. 22 08 396. After the connection has been completely established, the time channel concerned can transmit only useful messages during message transmission, apart from a time position occupancy marker and a message marker, since the channel concerned is selected during establishment of the connection and fixed with respect to the start of the frame for this connection by its ordinal number. Thus the destination address does not need to be also transmitted during transmission of messages since it is contained as timing information in the position the channel has in time with respect to the start of the frame and cannot be mistaken. In this known message transmission system containing a transmission network consisting of a pure branching network without closed loops and in the individual branches of a two-wire line serving in each case for bidirectional transmission purposes, the totality of all messages sent is carried in the whole network. Considering a condition in which a connection is not just being established, of all existing connections only those time slots are occupied which can be nested in the nodes without temporary storage. In such a system with nondirectional message transmission, the traffic occurring in the existing connections loads the whole network of conductors even if messages are exchanged by closely adjoining subscribers.

SUMMARY OF THE INVENTION

It is an object of the present invention to provide a digital time-division multiplex telecommunication system in which the number of transmission channels required by a plurality of subscribers in the network for handling narrow-band and/or wide-band services is reduced in order to increase the number of subscriber stations, which can be present in a network for a given transmission bit rate, to a corresponding extent.

Another object of the present invention resides in a digital time-division multiplex telecommunication system in which the reliablity of the system with respect to breaks in the two-wire network or system component failures is increased and the telecommunication system is provided with improved protection against interception of calls with respect to other multiple-access systems, while simultaneously the network structure of the telecommunication system is provided with a modular configuration and greater flexibility.

According to the invention, the desired properties of the telecommunication system are achieved by a directional transmission of the messages over the shortest path between the communicating subscribers, by multiple utilization of a transmission channel for simultaneous independent connections and by time-position addressing of the messages.

To this end, the branching nodes inserted into the line network for message input and output purposes must perform a message directing function.

According to the invention, multiple utilization of a message channel is made possible for several simultaneous independent connections, and thus an increased channel utilization with directional message transmission and time-position addressing of the message blocks. As a rule, each section of the network of conductors, that is to say each path of the two-wire lines between two branching nodes, presents a different state of channel occupancy. For this reason it is important for the invention that a channel which is free through its whole length is found between two subscriber stations. This purpose is served by the measures taken during the phase of signalling and establishing the connection and by the structure of the branching nodes, explained in greater detail hereafter.

In the conductor-dependent fully-synchronous telecommunication system, presented here, in which the subscribers exchange their messages in multiple access mode on common time-division multiplex transmission channels via branching nodes allocated to the subscribers, a directional message transmission with simultaneous time-position addressing of the message blocks takes place by directing the message blocks to the branching node inserted into the two-wire bidirectional transmission network for the purpose of message input and output. These nodes are able to generate the control information required for directing the messages by themselves during the signalling phase or to receive it from a central unit in the network.

With respect to keeping the structure of the branching nodes as uniform as possible, only nodes having three branches and one incoming and outgoing conductor each with respect to the message flow are being provided. The branching nodes of the subscriber stations (subscriber nodes) and the branching nodes which connect three two-wire network branches (line network nodes) and preferably of identical construction. They are provided with small modifications, however, depending on their application in the telecommunication system. Due to the uniform structure of the branching nodes, also with respect to the different line network configurations, the nodes can be built up of few standard modules which offer the opportunity of implementing the modules in LS I or VLS I semi-conductor components.

A message coming in from a branch direction in a channel is switched through to the same channel of the outgoing directions of the two remaining branches or only one branch, or suppressed if the channel in the two other branches is occupied. If a channel is occupied in a conductor, the same channel in the associated second conductor of the pair of conductors is also occupied (paired channel occupancy).

For the message exchange between network subscribers, for each channel of the incoming directions of the three branches in the branching nodes the direction must be determined in which the messages must be switched through, so that message blocks pass only along the route determined by the minimum path requirement between communicating subscriber stations and the identical channels are available for further connections in other network sections.

For controlling the message switching in the branching nodes, the channel occupancy status of the individual branches must be stored there (for example occupancy with free time slots, signalling time slots or message time slots). For this reason, the nodes are provided for each branch with a memory for the occupancy statuses. Since in the general case the phase relationship of the start of the frames on the lines at the branching node is arbitrary, delay equalization sections (stores) must also be provided which guarantee that the messages of the time slots of one branch are coupled into those of the other branches of the node in the correct phase.

The maximum delay time which must be equalized between the branches of the nodes is half a time frame length. Branching nodes connecting the line network branches require two stores with a maximum number of storage spaces corresponding to half the time frame length. By converting the serial bit stream of the lines to a parallel bit stream, the working speed of the delay equalization store can be lowered in the branching node which, however, requires two fast serial/parallel convertors or parallel/serial convertors of a half or full-time slot length, depending on the degree of conversion to parallel. Branching nodes of a subscriber station require a minimum of two stores per time slot, depending on the service requirements for the subscriber station.

In star networks, the individual line network branches are joined to one another at a central nodal point. So that messages are switched through at this point without blocking, several branching nodes can be connected in parallel and in series. Connecting branching nodes exclusively in series leads to blocking.

In order to establish a connection between a calling subscriber A and a called subscriber B, the subscriber station of subscriber A must send, during a signalling phase, a call to the subscriber station of subscriber B via the associated branching nodes and a free channel in the line network. The call contains the address of the calling and of the called subscriber. A channel is free in the outgoing direction at a branching node when free time slots are received from the associated incoming direction in the same channel.

In each branching node in the network all free channels of the incoming directions are monitored for calls. The sate of occupancy of the individual channels of the three branches is stored in the branching node (channel free, channel occupied with call, call acknowledgment or data and the like).

The control system of the branching node periodically interrogates the channel occupancy stores for their contents. A call on, for example, channel 10, branch 2, is then distributed at the line network branching nodes to the channels having the same time position in the two other outgoing directions if the channel is free in those directions (channel 10, branch 1,3), or otherwise suppressed. After that the branching node waits for a call acknowledgement by subscriber B in channel 10 from the directions of branches 1,3. A call reaching the branching nodes of the subscriber station is transferred by the node to the control system of the subscriber station if the call contains the address of this subscriber station, or otherwise only switched through to the outgoing branch. Each subscriber station sends out such a call acknowledgment if it receives a call. The call acknowledgment is sent only in the direction from which the call has been received. The call acknowledgment finds a channel which is free through to subscriber A, since a call in a channel causes the branching nodes to reserve the corresponding return channel for the call acknowledgment.

The direction from which after a call a call acknowledgment arrives at the node marks the direction in which subscriber B can be reached from the branching node. If in the example selected a call acknowledgment arrives at the branch 3 of the line network node, channel 10 of the branch 2 must be switched through for further calls, call acknowledgments or messages on branch 3.

If the subscriber station of subscriber A receives a call acknowledgment, it recognizes from the format of the time slot if subscriber B is free or occupied. For further signalling, a distinction must be made between two cases:

(a) For the case that subscriber B is free, the subscriber station of subscriber A continues its call and receives as acknowledgment of the call a call acknowledge signal until subscriber B starts with the exchange of messages. The format of the message time slots enables the subscriber station of subscriber A to recognize the beginning of the communication and, in turn, switches over to message exchange.

A connection is released when the calling or called subscriber station sends time slots having a format provided for this purpose. The sending of special end slots has the advantage, with respect to releasing a connection by means of free time slots, that a distinction can be made between an intentional and an unintentional release of the connection.

(b) In the case that subscriber B is engaged and subscriber A receives a call return as call acknowledgement, subscriber A can decide whether he wishes to end the call or to continue it until subscriber B is free.

If the call of subscriber A is not acknowledge by the subscriber station of subscriber B, for example if free time slots are received in the return channel associated with the call channel, the call has not reached subscriber B due to an already existing occupancy of the call channel on a channel section between the two subscribers. The channel is, therefore, not free throughout. The subscriber station of subscriber A then transmits new calls on other channels which are free at their branching nodes until either a call acknowledgment arrives or all of these channels have been checked one or more times and found to be not free through to subscriber B.

On line network sections, which do not overlap with respect to certain connections, a directional message transmission of this type makes it possible to use a message channel in the network several times for several simultaneous connections. This principle of message traffic handling can be applied to line networks with a line-, ring- or star-shaped and branched structure. For generating a uniform time frame and time slot structure for the time-division multiplex channels, the networks are equipped with a synchronizing information generator and, in the case of line, branching and star networks, are equipped at all line network ends with generators for reflecting and, as the case may be, delaying the received synchronizing information so that the synchronizing information is available everywhere on both conductors of the line network. In the telecommunication system according to the invention, however, the message flow occurs always only in sections of the network.

In ring networks with bidirectional two-wire lines two connection routes are available for a connection between two subscribers so that during the signalling phase the decision can be made which of the two routes is to be selected for exchanging messages in the communication state. For economical utilization of the channels it is important that the traffic occurring in a connection loads only the shortest possible channel sections or channel sections with few subscribers. To this end, in the signalling phase, for example for determining the route with the smaller number of subscribers between two subscribers A and B, the called or the calling subscriber station of subscriber B or A can send out a special format for counting call time slots, the contents of which format are incremented by a certain value each time it passes through a branching node. The counting call time slots arising from two directions at the subscriber station of subscriber A or B then provide information about the number of subscribers on both routes. The subscriber station A or B then decides which is the more favorable route and then transmits calls or call acknowledgments only in that direction. After a repeated successful exchange of calls and call acknowledgments the messages are exchanged between these subscriber stations A and B via this selected route. If one of the two connection routes is already completely occupied, the connection is made via the remaining and possibly also unfavorable route.

In contrast to comparable known telecommunication systems, which do not carry out directional message transmission and multiple occupancy of a channel for simultaneous independent connections, the telecommunication system according to the invention leads to the number of channels required in the line network being reduced by 50 to 75% in ring, line and branching networks. This provides better channel utilization. It makes it possible to have 2-4 times the number of subscribers in a network or to process 2-4 times the subscriber traffic, or to lower the transmission bit rate of the telecommunication system by a factor of 2-4. The channel utilization is improved even further if a message exchanged between neighboring subscribers takes place more frequently than between partners which are further apart.

A further advantage of the present invention resides in that interference has only a slight effect. With single or multiple breaks in the two-wire network and assuming that the branching nodes are mutually synchronized even without a central clock supply, the network sections arising, for example, with a cable breakage or branching node failure remain fully functional. Network sections which are separated from one another cannot be connected. Only connections which cross the damage point are affected. At a maximum, these are 25% of the connections in the ring networks and between 0 and 50% of the connections in line, branching and star networks if at the time of damage all channels in the two-wire network are occupied and the line network is interrupted. In the star network the number of connections disturbed by a cable breakage drops with the number of network branches.

With a break in the two-wire network of a ring-structure a connection can be re-established automatically via the second route and this establishing of a connection can receive priority with respect to other new connections. The calling subscriber station which is affected by a break in the connection, and only this one, receives authorization to suppress calls of other future connections, which arrive at the station, and to utilize the channel for the existing connection. However, it is allowed to carry out this process only if all channels are already occupied.

Due to the directional message transmission, in the telecommunication system according to the invention at each location of the network only a part of the total traffic occurring is carried so that at a certain point in the network not the whole but only a limited traffic flow would be accessible to possible interception (0–50%).

For the directional message transmission, the branching nodes must be able to send and receive on both conductors of the two-wire network. The outlay in circuitry required by this, however, leads, with the modular construction of an essentially identical construction for all branching nodes and, in consequence, the possibility of being able to implement the system in large numbers in integrated semi-conductor technology, to relatively low prices per item.

A further advantage of the telecommunication system according to the invention lies in that several advantageous performance characteristics can be implemented without problems. Since, for example, the direction of channel switching in the branching nodes of the line network is determined only from the directions from which calls and call acknowledgments are received without having to evaluate the addresses in the signalling time slot, a call number distribution is made possible which is both independent of location and flexible. Charge accounting can take place at the same central point if the channels for the connections between the subscribers are allocated under central control. If the connections are built up and broken down under decentralized control of the subscriber stations, the charges are picked up at the individual subscriber stations and can be transmitted for long-term accumulation to a central unit by means of special signalling measures. This circumstance permits the charges to be counted optionally at the calling or at the called subscriber and to change over the location of counting with mutual agreement while a connection is made. During signalling the called subscriber station is informed of the address of the calling subscriber; this makes it possible to enquire and to indicate the call number of the calling subscriber if the called subscriber is engaged. A further performance characteristic is the automatic repetition of the call which can be designed on the basis of the fact that the call number of the called station is stored in any case in the calling subscriber station already for the first call made.

BRIEF DESCRIPTION OF THE DRAWINGS

Some preferred embodiments of the invention will now be described by way of example and with reference to the accompanying diagrammatic drawings, in which:

FIG. 1 shows a section from a two-wire network with directional message transmission and multiple occupation of a channel;

FIG. 2 shows a line network;

FIG. 3 shows a two-wire network with a ring-structure;

FIG. 12 shows a block diagram of a central node system for a star network;

FIG. 14 shows a representation of the structure of the time-division multiplex frame and the format of individual time slots;

DESCRIPTION OF THE PREFERRED EMBODIMENTS

Figure 4:
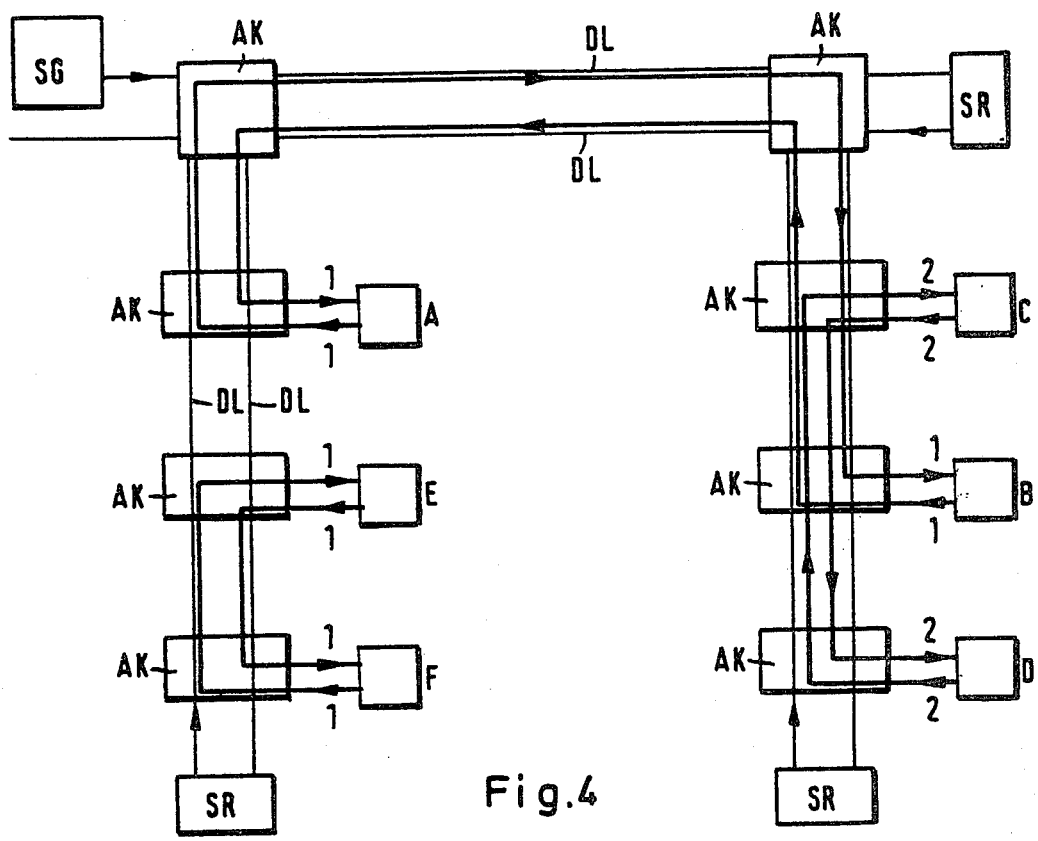
FIG. 4 shows a branching network.

In the section, shown in FIG. 1, of a network with a bidirectional two-wire transmission line DL branching nodes AK are provided to the input and output of messages at each subscriber station TS. Each of the branching nodes AK is provided with three branches, one of which leads here in each case to a subscriber station TS. In the example shown, a connection exists between subscribers A and B via channel 1, between subscribers C and D a connection exists via channel 2, between subscribers E and F another connection exists via channel 1 and between subscribers which are not shown a connection exists via channel 3. Thus channel 1 is used here for two mutually independent connections which exist simultaneously in paths which do not overlap. The messages sent by subscriber A via the upper conductor in the drawing to subscriber B in channel 1 are received by the subscriber station TS of subscriber B and removed from channel 1 and cleared so that channel 1 is free again in the direction not leading to subscriber A. Thus it can be used for the messages to be sent by subscriber E to subscriber F. The corresponding conditions hold for the return paths from subscriber F to subscriber E and from subscriber B to subscriber A. Since subscriber C is located between subscribers A and B, channel 1, which had previously been seized by subscribers A and B, cannot also be used for the connection between subscribers C and D.

The line network shown in FIG. 2 is equipped with a synchronzing information generator SG (sync generator) and a generator SR (sync reflex) which reflects synchronizing information. The synchronizing information generator SG generates the time frames and sends them along one conductor of the two-wire line DL. These periodically repetitive time frames have at their start frame synchronizing information and empty time slots which are made available to the connected subscribers as time-division multiplex channels (see also FIG. 14). The sync reflex generator SR or the last branching node AK receives the synchronizing information and sends it out on the other conductor of the two-wire line DL. The connected subscriber stations TS are thus in a position to detect the time frames on both conductors of the two-wire line DL.

Although in the embodiments of the invention all receiving subscriber stations TS remove the messages intended for them end clear them, that is to say only synchronizing information and empty time slots can arrive at the sync reflex generator SR, it is of advantage to use, at this point too, the circuits provided in the prior art for clearing and not retransmitting the incoming messages, apart from the synchronizing information. This safely prevents any message blocks, which have not been properly cleared due to possible faults in network components, from reaching the other conductor of the two-wire line DL. In addition, in the line network the synchronizing information to be sent out does not need to be delayed in the sync reflex generator SR since there is no requirement at any place in the network for the generally varying phase relationship of the time-division multiplex frames to assume any special value. In any case, each subscriber station TS must determine the start of the frames for sending and receiving on each of the two conductors of the two-wire line DL independently of one another. Insofar as, therefore, no safety precautions are to be taken with the sync reflex generator SR in the line network, its place can also be taken by a short circuit of both lines of the two-wire line DL at the branch of the last branching node AK forming the end of the line network.

With respect to the directional message transmission between pairs of subscribers in the line network, the same relationships hold which have been explained in connection with FIG. 1. Thus for clarification, in FIG. 2 only two connections are indicated which are those between subscribers A and B and subscribers C and D via channels 1 and 2, respectively.

In a double ring network as shown in FIG. 3, the two-wire line DL is closed in itself, that is to say the one conductor of the two-wire line DL forms an outer ring Ra which is closed in itself and the other conductor forms an inner ring Ri which is closed in itself. In this arrangement a delay equalization must be performed for a full frame length at one point in each ring, this point being advantageously the branching node AK 11, to the third branch of which the synchronizing information generator SG is connected. The details in connection with this arrangement are explained in greater detail further below in conjunction with the description of the branching nodes. For some of the subscriber stations TS shown in FIG. 3, existing connections are indicated with the respective channels. Since, for example, the paths for the connections between subscribers A and B and subscribers C and D overlap, two separate pairs of channels must be provided for these connections. For a connection between the subscribers E and F, however, the channel 1 can be seized, as indicated, or similarly the channel 2. In accordance with the example shown, for a connection between subscribers G and H channel 1 can be used neither in the nor in the other direction since the subscriber stations TS of subscriber H are in an area in which channel 1 is already occupied by the connection between subscribers A and B. In addition, on the path leading via the part of the double ring which is on the left-hand side in FIG. 3, between subscribers G and H, a network section is located in which channel 1 is occupied for the connection between subscribers E and F. On the other hand, channel 2 can be used over this route for a connection between subscribers G and H, this channel being used over the other route, the part of the double ring which is on the right-hand side in FIG. 3, already for the connection between subscribers C and D.

FIG. 4 shows the basic principle of the invention as applied to a branching network, only two branches turning off the main branch being shown, for the sake of clarity. Since subscribers A and B are located in different branches, the channel 1, which is used by them for their connection, must be switched via the main branch. Subscribers C and D are not immediately adjoining and subscriber B, which is located between them, has already seized channel 1. The connection between subscribers C and D is therefore made, for example, via channel 2 which, however, remains free both in the main branch and in the other branch. Thus, for a connection between subscribers E and F both channel 2 and, as shown, channel 1 can be used. Whereas channel 1 can therefore be considered for this connection in the chosen example because subscribers E and F are not located between subscribers A and B, for example channel 2 could be considered particularly if the local positions of subscribers A and E (or A and F) were interchanged.

Figure 5:
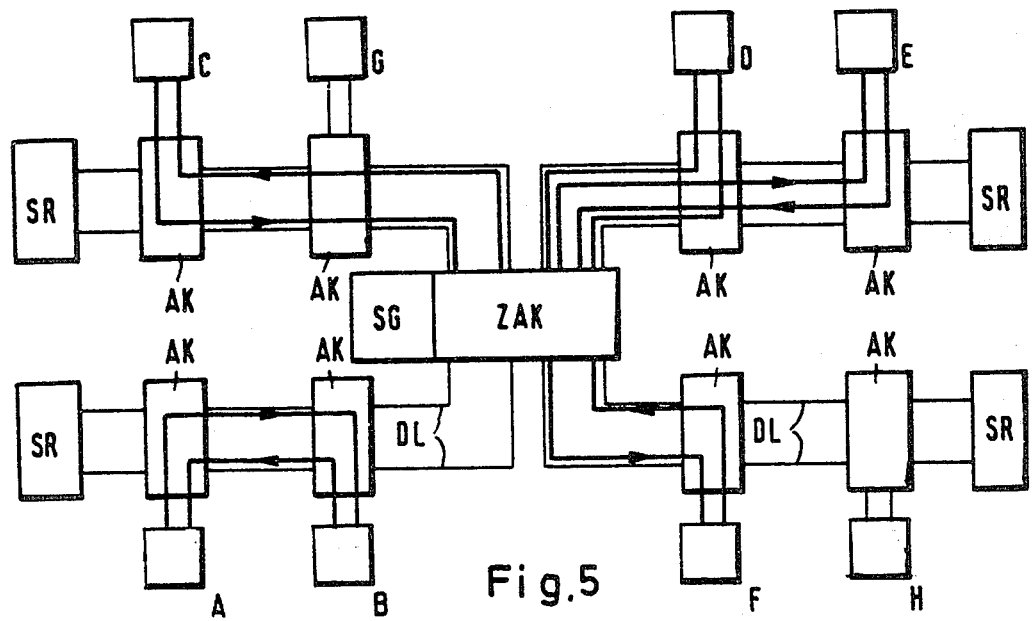
FIG. 5 shows a star network.

A star network, such as is shown in FIG. 5, requires at a central point a branching node unit ZAK at which all the channels of all branches can be joined to one another. Such switching via the central branching node unit ZAK is, of course, not required if a connection remains within one branch, as is shown in FIG. 5 for subscribers A and B. If, for example, channel 1 is selected for a connection between subscribers C and D, channel 1 cannot be used for the connection between subscribers E and F, in accordance with the previous explanations, but, instead, channel 2. If subscribers G and H want to establish a connection, subscriber G would find channel 1 occupied and channel 2 free up to the central branching node unit ZAK but from then on occupied in the direction of subscriber H. A similar condition applies if subscriber H is considered. In this case, therefore, for example channel 3 could be considered for the connection between subscribers G and H.

The central branching node unit ZAK is configured in such a manner that a plurality of simultaneous connections can be switched through without blockage even if the connections have the same channel position, which is an essential characteristic of the telecommunication system according to the invention. Since, as can be seen in the example of the connection between subscribers A and B in FIG. 5 and has already been mentioned above, some channels are used for connections which do not run via the central branching node unit ZAK but remain in one branch, there is no requirement for transmitting the maximum possible number of simultaneous connections in the same channel.

The synchronizing information generator SG is allocated in FIG. 5 directly to the central branching node unit ZAK but it can be located at any point in the network. In star and branching networks, the phase relationships of the time-division multiplex frames must be adjusted by adjusting the associated delay time in the sync reflex generator SR to the conditions prevailing at the branching node unit ZAK and the higher-order branching node AK.

Figure 6:
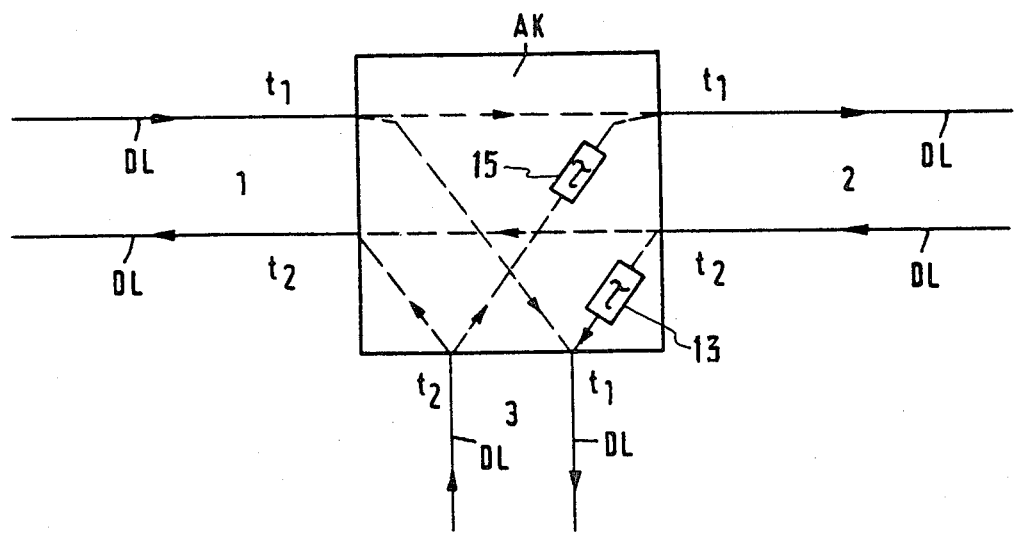
FIG. 6 shows the structure of a branching node.

With respect to this consideration, it can be seen from the structure of a branching node AK, shown in FIG. 6, that there a time-division multiplex frame on the incoming conductor of branch 1 begins, for example, at time $t_1$. This frame is switched through without delay directly to the outgoing conductors of the branches 2 and 3 so that there, too, time $t_1$ holds for the beginning of the frame. From the direction of branch 2 the time frame arrives at time $t_2$ due to the general arbitrary phase relationship. This time $t_2$ also applies to the outgoing conductor of branch 1 and thus the frame is switched through without delay for each conductor of the two-wire line DL between the branches 1 and 2. This provides a preferred direction for switching through the channels in the branching node AK, which should be reserved for the transit or main paths of the network. Since, on the one hand, time $t_1$ for the beginning of the frame is determined for the outgoing conductor of branch 3 already by the incoming conductor of branch 1 but, on the other hand, the beginnings of the frames arriving at time $t_2$ on the incoming conductor of branch 2 must reach the outgoing conductor of branch 3 synchronously, a time-delay section $\tau 13$ must be provided between the input of branch 2 and the output of branch 3. By means of the sync reflex generator (not shown), connected at the end of the section of the line turning off branch 3, the frame delay time is adjusted in such a manner that the beginning of the frame on the incoming conductor of branch 3 arrives at the line network node at time $t_2$. At the subscriber node a corresponding synchronization of the subscriber station causes the beginning of the frame on the incoming conductor of branch 3 also to be adjusted to time $t_2$. This input can, therefore, be connected directly to the output of branch 1. There is then here, also, a difference in time delay, with respect to the output of branch 2, which can be equalized by an identical time-delay section $\tau 15$. These time-delay sections only need to equalize a maximum of half a frame length. If time $t_2$ is less than half a frame length after $t_1$, the time-delay sections $\tau$ are switched electronically between the branches 1 and 3 instead of between the branches 1 and 2.

Figure 7:
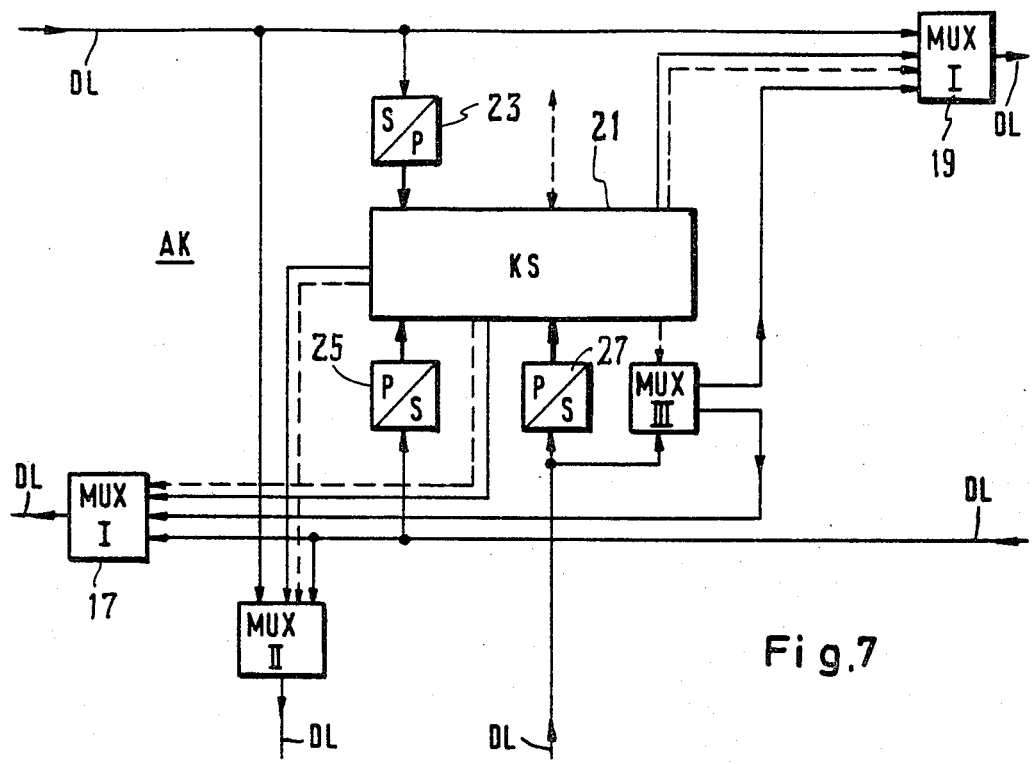
FIG. 7 shows a block diagram of a network branching node for three two-wire branches.

FIG. 7 shows the block diagram of a branching node AK for connecting three line network branches with a serial digital data stream.

The messages of the individual channels received at the branching node from the respective other directions can be switched through to the output of a branch via multiplexers MUX I 17, 19 and MUX II of the individual branches. The node control system 21 handles the control paths via a special line in accordance with the signalling information evaluated by it. Node control system 21 is able to send synchronizing information via a further line and messages on the outgoing lines. In each case only one of the three information-carrying lines is switched through.

The messages received from the three branching directions, which arrive as a serial data stream, are fed via series/parallel converter 23, 25, 27 to the node control system 21, are read by it and evaluated for generating control information.

A multiplexer MUX III can be used to switch the messages received from the lower branch through in the correct phase relationship to the time-division multiplex frames of the send lines of the left-hand and right-hand branch directly or via a time-delay memory.

The multiplexer MUX II also contains a time-delay memory which makes it possible to couple the received messages of the left-hand and right-hand branch to the third branch in the correct phase relationship.

Figure 8:
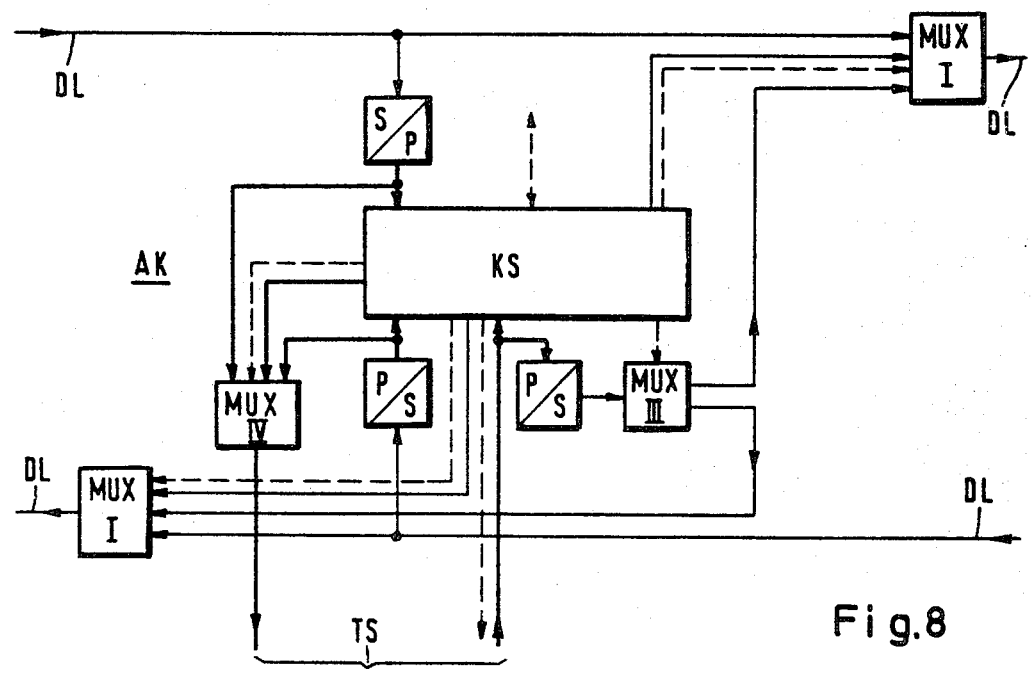
FIG. 8 shows a block diagram of a branching node of a subscriber station.

The branching node AK, shown in FIG. 8 as a block diagram, differs from the branching node of FIG. 7 in that the lower branch is configured for connection of the units belonging to the subscriber station. The message output and input on this branch takes the form of a data stream, which has been converted to a parallel stream, with a word length which corresponds to the length of the time slot. In the embodiment of the invention described here, the chosen time slot length is 34 bits. An additional data line is provided for exchanging control information between the branching node and the remaining units of the subscriber station.

Since the basic configuration of the two types of branching nodes as shown in FIGS. 7 and 8 is identical, they can be combined in one branching node, producing a certain redundancy in node design, but providing the advantage of only one branching node type being required.

Figure 15:
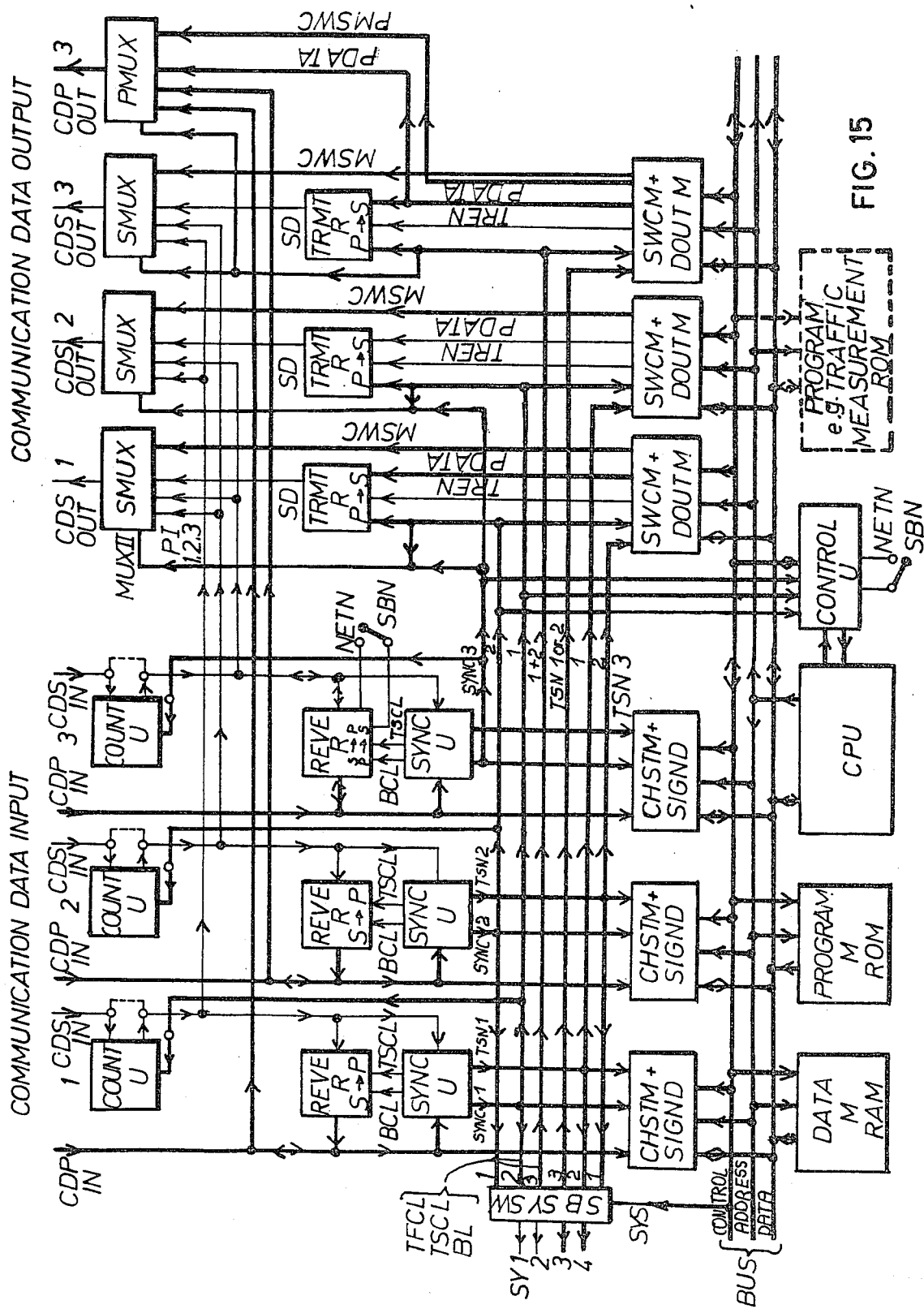
FIG. 15 shows the standarized branching node.

FIG. 15 shows a detailed block diagram of the standardized branching node AK. It is described in greater detail further below.

Figure 9:
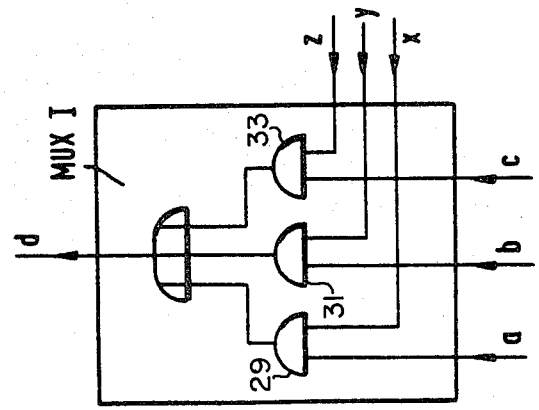
FIG. 9 shows a block diagram of a multiplexer for combining message streams without delay equalization.

FIG. 9 shows the configuration of a multiplexer MUX I in which the message streams a, b, c from three directions are nested into one another without delay time equalization. These message streams originate from the incoming lines of two branches of a branching node AK and a node control system KS and are transmitted channel by channel to the outgoing line of the third branch. For this purpose three AND gates 29, 31, 33 are provided which are controlled by the node control system KS via x, y, z, the outputs of which are connected to an OR gate the output d of which is identical with the outgoing line of the branch concerned.

Figure 10:
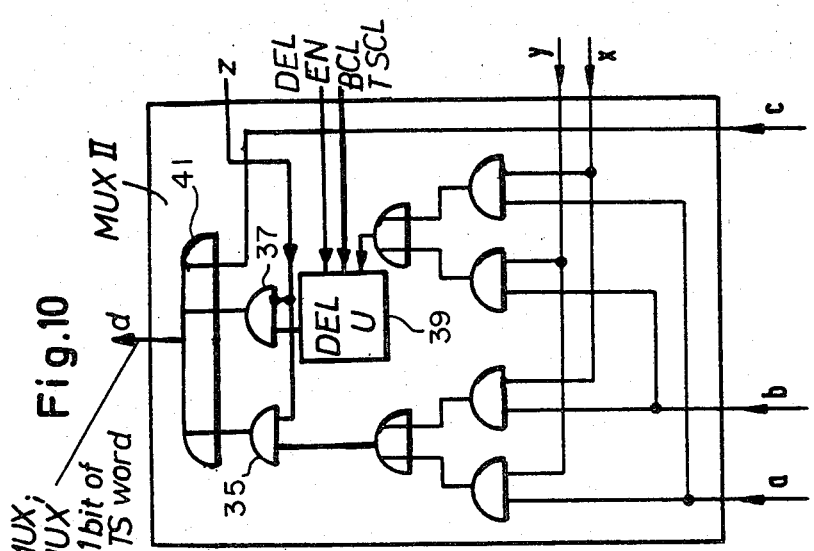
FIG. 10 shows a block diagram of a multiplexer for combining message streams with delay equalization.

FIG. 10 shows the configuration of a multiplexer MUX II in which two message streams a and b are combined which arrive with non-synchronous frames. For this purpose two pairs, which can be controlled via x, y are each connected by means of an AND gate 35 and an AND gate 37 with an inverted input so that each of the two arriving message streams a and b can take its route both via the one branch without and the other branch with delay $\tau 39$. At a further OR gate 41 time slots c, which have been sent out by the node control system KS, and the arriving message streams a and b are nested into one another channel by channel on the outgoing line d of the corresponding branch of a branching node AK. A multiplexer MUX IV for connecting a subscriber station, that is to say for parallel retransmission of data, consists of one multiplexer MUX II each for each bit of a channel, that is to say of a time slot.

Figure 11:
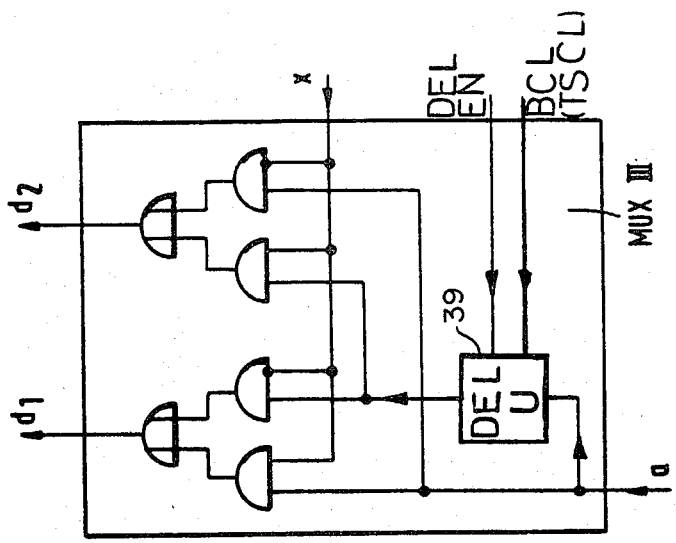
FIG. 11 shows a block diagram of a multiplexer for transmitting a message stream in one direction with delay equalization and in the other direction without delay equalization.

FIG. 11 shows a multiplexer MUX III which can be used to pass on an arriving message stream a both delayed via the time delay section $\tau 39$ and undelayed, controlled via x by the node control system KS to one of the two outputs $d_1$ or $d_2$ leading to a multiplexer MUX I. In this arrangement the time-delay section $\tau 39$ is placed in front of the inputs of two of the four AND gates. This makes it possible to exchange the branches electronically, as mentioned in connection with FIG. 6, so that the time-delay sections need to have only a maximum capacity of half a frame length since the amount of phase difference between the beginnings of the frames is a maximum of half a frame length. The time-delay sections of the branching nodes of the subscriber stations require one or several time slot storage spaces, depending on the number of the services performed simultaneously by a subscriber station (see subscriber station).

FIG. 12 shows a central branching node unit ZAK for a star network. For each branch of a two-wire line DL of the star network in the central unit ZAK one module 41 each is provided which is configured with the branching nodes AK, an OR gate 43 and a node control system ZKS for this module. The task of the central branching node unit ZAK consists in switching through a plurality of simultaneous connections, also with the same channel position, between the individual branches. For this all branches are connected to several two-wire line networks connected in parallel, each line containing one branching node AK each for each module. Since via each such line in the most unfavorable case only a single connection per channel can be switched through, for the simultaneous switching-through of further connections with the same channel position in each case a further, parallel-connected line is provided. The node control systems ZKS in the modules take care that a certain connection is always only connected through via one line. The OR gates 43 are used to combine the outgoing conductors of the branching nodes AK for the outgoing conductor of the two-wire line DL of the branch concerned of the star network. In order to be able to switch the channels through without blockage in the central branching node unit ZAK between m branches of a star network, only a maximum of m/2 parallel-connected lines need to be provided. If, as also shown in FIG. 5, the synchronizing information generator SG is located immediately adjacent to the central branching node unit ZAK, all the lines of the parallel-connected lines leading to the branching nodes AK are connected to the synchronizing information generator SG. The central branching node unit ZAK can be extended by inserting further modules into the parallel-connected lines for further branches of the star network. Should the freedom from blockage be no longer guaranteed due to such extensions, the modules can also be extended in a simple manner by means of further parallel-connected lines.

With reference to the equalization of delay times, particularly favorable conditions are created with star networks containing a central branching node unit ZAK if sync reflex generators SR at the ends of the two-wire lines DL of each branch are used to adjust the phases of all incoming and outgoing lines of the branches to be synchronous at the central branching node unit ZAK. This makes it possible to eliminate all delay sections within the branching nodes AK since in the line network there is no difference in delay times between the two conductors at the branching node unit ZAK.

Figure 13:
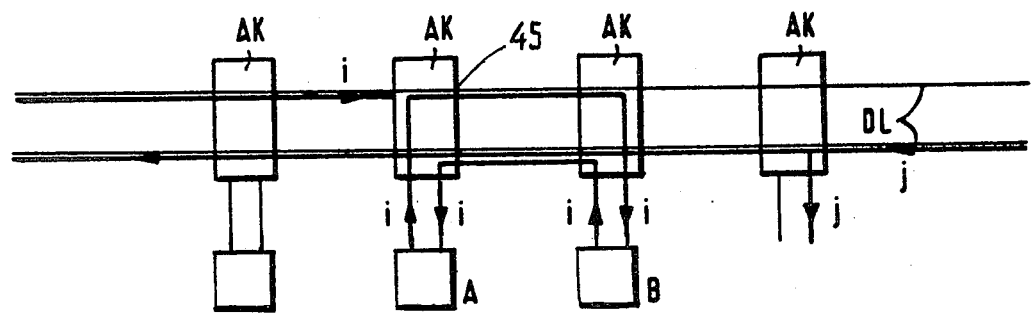
FIG. 13 shows a section from a two-wire network and showing the suppression of a call which encounters an already occupied channel.

FIG. 13 shows that a call arriving on channel i from the left-hand side in the drawing is suppressed at the branching node AK 45 at which this channel i is already occupied for the connection between subscribers A and B. A call arriving in channel j from the right-hand side in the drawing, however, is passed on in those branching nodes AK which do not already switch this channel j through for another connection at this time.

FIG. 14 shows the structure of a time frame for the time-division multiplex telecommunication system and of some time slots. The time frame consists of n time slots of equal length, a so-called frame synchronizing information or frame sync word being sent out, for one time slot period each, at the start of the periodically successive time frames. This is followed by time slots 1 to n−1 of the frame, which are available to the connected subscriber stations as time-division multiplex channels for signalling and message exchange purposes.

In the selected embodiment of the invention each time slot, including the one at the beginning of a time frame for the frame sync word, begins with a "1", the so-called sync bit. For identifying and distinguishing signalling information and message data, the bit in the second position is set to "0" or "1". The following four bits are reserved for signalling purposes and for distinguishing the front signalling formats. Thus, for example, a call is coded "1000", a call answer or acknowledgment is coded "1010", a call answer (occupied subscriber) is coded "0010", a connection end or release is coded "0001" and a call with subscriber counting is coded "1011" or similarly. When messages are exchanged within an established connection, these four bits are also available for useful information with the pure time position addressing used in the embodiments of the invention. Accordingly, a free time slot is given a bit pattern beginning with a "1", which is followed by a "0" as signalling identification and, in the third, fourth, fifth and sixth position another "0" each as identification of a "free" time slot. The bits following this up to the end of the time slot can all be set to "0" but, in practice, are provided with a special pattern, for example a pseudo noise sequence which cannot be mixed up with other bit patterns and allows the electronic transmission and switching systems to be simplified due to the change between zeros and ones.

In telecommunication networks with a locally fixed, hierarchical (sequential) call number distribution of the connected subscriber stations it is possible, for the purpose of channel search, to determine directly which channels are free throughout, for which purpose a released time slot must receive the address of the subscriber station which has removed the messages intended for it from this time-division multiplex channel. The other subscriber stations receive from the two opposite directions the empty time slots, provided with the addresses, for example, ADR1, ADR4, of the subscribers which have released the channel on both sides of the subscriber station. The channel is then free for a connection between the subscribers with the addresses ADR 2, ADR 3, if ADR 1 < ADR 2, ADR 3 < ADR 4 and ADR 1 < ADR 4. The details of the telecommunication system according to the invention, which are explained in greater detail hereafter, are partially already apparent in connection with the embodiments shown individually diagrammatically and described above, and provide a clearer picture of their advantageous properties.

In embodiments of the invention, the direction of channel switching is determined in accordance with a method permitting a free and variable distribution of call numbers in the network. By this is meant both the possibility that a subscriber can keep his call number if he moves to a different location within the network and—with approximately equipped subscriber stations—can be reached at a different subscriber station in the network under his own call number while staying at this location for a short period. This does not involve any subscriber call number mapping and translating at, for example, a switching node or main exchange. On the basis of the principle underlying the invention, the direction in which the traffic is to be directed is determined in the networks without central channel management without any such evaluating, mapping or translating of the subscriber call numbers in line network nodes.

The two-wire network shows the following peculiarities in signalling:

Since the call sent out by subscriber A simultaneously in both directions of the two-wire line network can reach subscriber B over two routes or from two directions, it is of importance for channel utilization to occupy within this connection only the shortest possible sections or sections with low traffic. This is done, for example, by means of the counting call method which uses as a criterion for the route length the number of subscriber stations located along the route. This number is registered during the counting phase of the call in the time slot of the call in a field reserved for this purpose. Each branching node passed by such a call time slot adds the value 1 to the value of the count bit in the time slot. The calling subscriber has set these count bits to "0" at the beginning.

Thus, with the counting call message, each branching node must check all time slots for whether a counting call is present. In order to reduce the outlay, counting can take place at every fifth or tenth branching node. The error in the determination of the lower number of subscribers along the route, arising due to this, is generally acceptable.

In order to select a section with less traffic, the traffic must be metered as is explained below.

Since in the ring network two connection routes are possible between two subscriber stations, the connection can be re-established automatically by the calling subscriber station over the second route in the case of a failure, for example with cable breakage. The fault is recognized by the fact that, instead of messages, empty time slots are received. A regular end of connection would be identified by the special time slot end format.

Independently of the network structure, all subscribers retain access to the network in the event of a cable breakage or component failure. Depending on network structure and the type of failure, the access is possibly limited to certain network areas. In the two-wire ring network this enables all subscribers to be reached in the case of a simple cable breakage, possibly with reduced quality of traffic.

With the embodiments of the invention there is no location at which the overall status of channel occupancy and the functioning of all network components can be detected centrally. The traffic is switched autonomously in the individual network areas so that central monitoring of the network is only possible indirectly. The operational status of the network is checked indirectly in that a switching center with the task of checking selects each network component via the freely available channels or via a service channel, interrogates it for information and acts on it with a control function. In this arrangement, data can be exchanged during all operational states of the components, that is to say while running (parallel processing of several tasks by the branching nodes and subscriber stations). The individual components must keep the data required by the switching center available in a memory (status memory). Such data consist, for example, of:

(a) at the subscriber station
  station free/occupied
  establishing/breaking down connection
  call repetition
  service performed: narrow-band, wide-band service
  error identification for
    data exchange with the network
    data exchange with the subscriber devices
    signalling
    charge accounting
(b) at branching nodes
  error identification for
    switching function
    data exchange with the network
    status of channel occupancy
(c) at the sync reflex generator
  error identification for
    synchronization
    data exchange with the network.

The transmission routes can be checked by the switching center transmitting pseudo messages (test signals) into the network which are directed to a branching node, a subscriber station or a sync reflex generator. The respective components reflect the messages, that is to say they return them to the switching center. The transmission route is free of interference if the messages are received without distortion.

Faults in network paths can be localized by the switching center selecting each network component (subscriber station, branching node and sync reflex generator) and requesting it to return the test signal transmitted to it. If the test signal arrives back at the switching center without errors, the transmission route is free of interference up to the component which has reflected the signal. By selecting components which are more and more remote, it can be determined from which component onwards a defect occurs.

Since the subscribers of a service-integrated network depending on their authorization, are allowed to access only certain services, it must be possible to check during the network operation whether subscriber stations are handling services for which they are not authorized. The type of service being performed by a station is stored in its status register so that the switching center is able to check a station by interrogating this register. If necessary, the switching center can then disconnect the subscriber station, that is to say exclude it from this service, via a service channel, or any channel, by means of a certain code word.

For several reasons it is important to the operator of a network that he can obtain knowledge about the state of network loading. This function is performed by metering the traffic flows in the individual line network paths which can be done by means of the following method:

In each mth (m=1, 5, 10) branching node the number of channels occupied in the mean per time unit is measured. This number serves, for example, also as a criterion for selecting the most favorable route in the two-wire ring network. This value is stored in the branching nodes and interrogated by the switching center. This provides the switching center with an image of the traffic flows in the total network and enables it to derive from this the measures required for controlling the traffic flows, for example with central channel allocation.

The traffic flows in the network can be controlled in such a manner that the individual subscribers do not receive access to all but only to a portion of the available channels. However, the subscribers can be dialled via all channels. This makes it possible to influence the probability with which the individual subscribers can find a free channel in the network and establish a connection.

The channels available for the individual subscriber can be allocated statically or dynamically. In the first case, the channels are firmly programmed in the hardware or software of the subscriber station, in the second case the channels can be allocated dynamically from a switching center. If the network is extended, necessitating a sectioning of the transmission route, the connections existing through this sectioning point are interfered with. An interruption in the connections can be avoided, on the one hand, by preventing new connections from being established over the intended sectioning point and, on the other hand, by extending the network only after all connections at this point have been terminated.

In order to execute these measures, a branching node in the vicinity of the intended break must be given the task of suppressing all calls on the channels and signalling the end of all connections at this location.

Charge accounting can be done on the basis of the following method:

At each subscriber station there are charge counters and memories, which determine and store the charges accruing over a fixed period of time (short-term charge accounting). The charge memory is then interrogated by a switching center sporadically or periodically depending on a short-term charge accounting period (charging period for example 1 hour). The short-term charges are summed at the switching center and at the subscriber station (long-term charge accounting) so that the total charges are known to both units. The total charges are determined separately in both units because, on the one hand, it is necessary that the charge accounting at the switching center is secured and protected from misuse and, on the other hand, the subscriber should be able to have an indication of the total charges without having the charges transmitted from the switching center. The sampling of short-term charges at the subscriber station performed by the switching center can take place several times in order to prevent transmission errors. Test charge counts can be performed from the switching center for checking the operation of charge accounting. With the safety precautions provided, this method of charge accounting guarantees correct charge counting for the operator and the user of the telecommunication system.

With local calls, the charges are counted at the calling subscriber and with long-distance calls optionally at the calling or at the called subscriber. This requires generation of a clock period which is used to perform the counting. The clock period defines the period of a call corresponding to one charge unit. It can be generated during the signalling phase and communicated to the two subscribers corresponding with one another via a signalling time slot. For the clock period a distinction must be made between connections within a tariff area (mostly the local network area) and those going beyond a tariff area. The clock period is fixed for connections within one tariff area independently of the distance between the subscribers correponding with one another. For long-distance calls it must be determined from the locations of the subscribers or from the call numbers, that is to say the subscriber addresses.

For connections within one tariff area (case a) or over several areas (case b) the following methods can be used:
(a) The subscriber stations set the clock period $T_z$ to the basic period (local timer) having the value $T_z = kT_o$ (k is the service-related weighting factor, and $T_o$ the time interval for the local area). The subscriber stations are mutually informed of the clock period via the signalling time slot. If a connection is established, the state of the charge counter is incremented by one unit at the beginning of the data exchange. Depending on the clock period, the charge counter then continues to count for the duration of the call.
(b) With connections over several tariff areas, the clock period can be generated in two ways:
  1. The clock period is determined by the basic period $kT_o$, written into the signalling time slot of both subscribers, being decremented by a certain value approximately $\Delta T$ at each of the n tariff area boundaries passed by the time slot: $T_z = k(T_o - n\Delta T)$. This task is handled by the nodes located at the boundaries.
  2. The branching node at the boundary of the tariff area calculates the clock period on the basis of the subscriber addresses present in the signalling time slot. This method presupposes that the call numbers identify the location of the subscribers in the network. A flexible distribution of call numbers is not easily possible in this case.

The decision, whether the charges are to be counted at calling or at the called subscriber, can be made during the signalling phase or during the call condition. It is thus possible to change the location of counting at any time; if there is no such decision, the charges are counted automatically at the calling subscriber. By operating an appropriate key, the identification in a signalling time slot is set to a certain code word which identifies the request for a transfer of charges. The called subscriber has the possibility before the beginning of the communication, to decide by means of the call number of the other subscriber indicated to him by the subscriber station if he wants to take over the charges or not, and he can then send out an appropriate acknowledge signal by pressing a key. If it is desired to change the charge handling between the subscribers during the communication, the data exchange will be interrupted for a short period of time. In order to avoid functional errors, the signalling processes are repeated over several frame periods.

FIG. 15 shows a detailed block diagram of the line network node (NETN) and of the subscriber node (SBN) combined in one module. For the architecture of the node the known structure of microcomputer systems has been selected which guarantees a wide flexibility of the node with respect to function implementation and hardware configuration. A multitude of performance characteristics, that is to say services in the telecommunication system, can be executed under program control. A multitude of components are at present already available for configuring the node, enabling the node to be implemented cost-effectively. If the network node is to be employed in large-scale telecommunication systems, that is to say in large numbers, the larger part of the node can be integrated by using LSI or VLSI techniques.

The block diagram of FIG. 15 is not drawn in all details, but only in its essential parts, since it can be assumed according to the prior art that, for example, the basic structure and operation of the microcomputer systems are known.

An explanation of the block diagram of FIG. 15 follows. The node can be arranged in three structural groups:
1. The receive section for the serial or parallel data streams of the receive lines of the three branches 1, 2, 3 (CDS 1, 2, 3 and CDP 1, 2, 3)
2. The transmit section for switching through
   (a) the serial data streams CDS 1, 2, 3 to the branches 1, 2, 3
   (b) the parallel data streams transmitted to the subscriber module via branch 3, and
   (c) output data of the node control system, such as free time slots and time slots with signalling information (FIG. 14) or test data.
3. The microcomputer system components.

Figure 17:
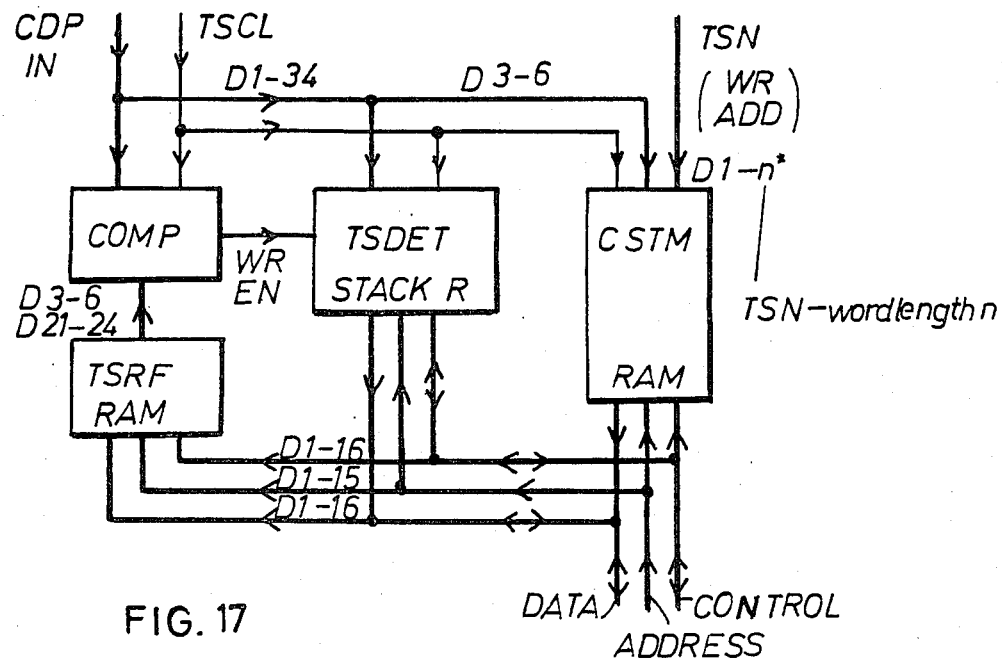
FIG. 17 shows the channel status memory.

Group 1 contains for each branch one receive register REVE R, one synchronizing unit SYNC U, one signalling information detector SIGND and one memory CHSTM (FIG. 17). The receive registers REVE R perform a serial/parallel conversion of the received serial data streams CDS 1, 2, 3. This process is synchronized by the bit and time-slot clock BCL, or TSCL. In the present illustrative embodiment, the serial bit stream is sub-divided into 34-bit data words, that is to say 34-bit time slots.

The appropriate synchronizing clocks are generated by the synchronizing unit SYNC U together with a time frame clock TFCL. This unit utilises a component known from DCM engineering in the prior art. With the aid of a phase locked loop, PLL, a bit counter, a time slot counter and a comparator for detecting the frame synchronizing word, it generates the BCL, TSCL and TFCL clocks and the currenht time slot number TSN. This provides all components with the necessary synchronizing clocks in the correct phase relationship to the data streams of the branches.

In the channel status memory CHSTM (FIG. 17) the occupancy statuses of the individual time slots TS (bits 3-6) of the time frame (TF) are stored. The units SIGND and CHSTM are interrogated periodically with the time frame clock TFCL by a central processor unit CPU, which has the task of checking and controlling, via the CONTROL, ADDRESS and DATA-BUS. This provides the CPU with knowledge of the occupancy status of the time slots TS, that is to say of the channels of all three receive lines of the branches and, additionally, of the information from the SIGND if and on which channel a call has arrived from which subscriber or, for example, from a central network monitoring unit. On the basis of these data and of data which have already been stored in the RAM from previous time frame periods, the CPU can now generate control data according to the program stored in the ROM program memory. A decision is made for each channel of the transmit directions CDS 1, 2, 3 or CDP 3 OUT of the branches which of the three receive lines CDS 1, 2, 3 or CDP 3 IN must be switched through. This information is written for each channel and branch via the BUS system into a switching control memory SWCM. The SWCM controls multiplexers SMUX and PMUX at the outputs of the branches and a transmit register TRMTR. At the SMUX in each case one of three data input lines DI 1, 2, 3 is switched through with a control line MSWC either undelayed, that is to say direct, or via a delay register. Four bits are available for this task in the SWCM.

For handling test jobs and signalling processes, for example for answering calls, the CPU must be able to output time slots to one of the three branches. For this purpose it writes the time slot into a data output memory DOUTM of the appropriate branch. The BUS system is here used for data transfer. In order to output the TS to serial transmit lines CDS 1, 2, 3 OUT, the data word must first undergo a parallel/serial conversion and the multiplexer SMUX must be switched through.

FIG. 17 shows the channel status memory CHSTM and the signalling detector. The received and parallel-converted data CDP 1, 2, 3 IN are in each unit fed to a comparator COMP which compares bits 3-6 and 21-34 of the TS with a reference time slot so that, for example, a call or a call acknowledgment can be recognized. If a call arrives which is directed to the node or the associated subscriber station, the time slot is transferred by write enable WREN into a TSDET register. Since a subscriber node can simultaneously handle several subscriber modules, that is to say can process several calls directed to the subscriber station, the TSDET register must have several TS storage spaces for registering the calls. The identification of all TS's of a time frame is written into the channel status memory (bits 3-6 of the TS). The CPU periodically interrogates the memories with the time frame clock via the BUS system. In order to reduce the number of interrogations, only the altered storage spaces may be interrogated, requiring an additional bit/TS.

Figure 18:
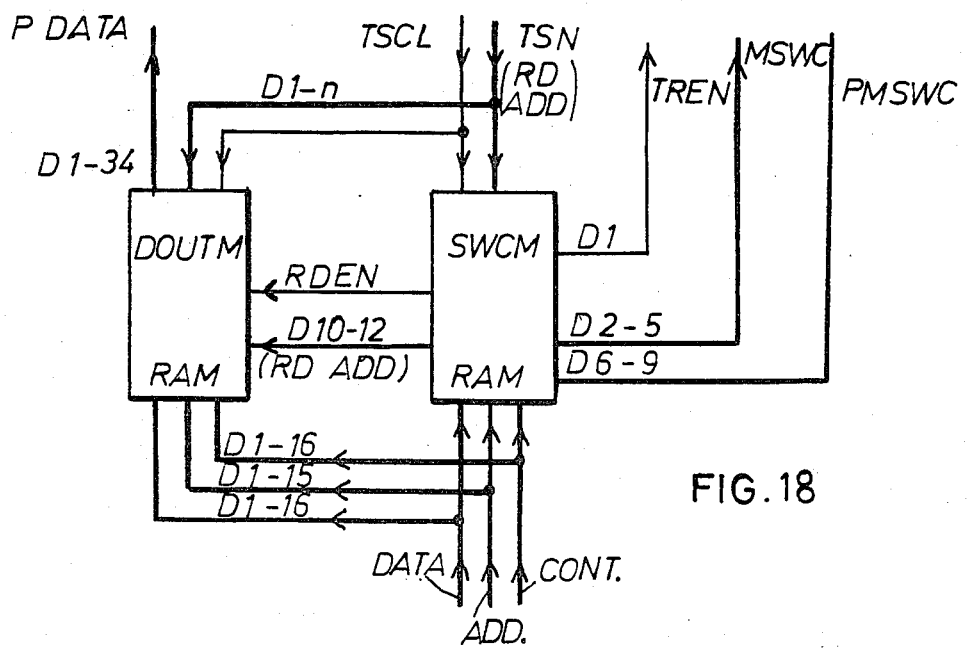
FIG. 18 shows the switching control memory and the data output memory.

FIG. 18 shows the Switching Control and Data Output Memory. The SWCM is read in cyclic synchronism with a time slot clock TSCL and a time slot number TSN so that the control information is present at the output of the transmit enable lines TREN, the multiplexer switch control MSWC and PMSWC (for PMUX). In addition, the contents of the DOUTM are output via RDEN for the current TS number. The memories are loaded via the BUS system.

Figure 19:
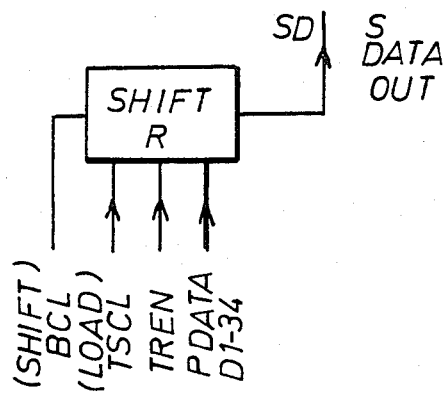
FIG. 19 shows the transmit register.

FIG. 19 shows the conventionally constructed shift register used as the Transmit Register.

Figure 20:
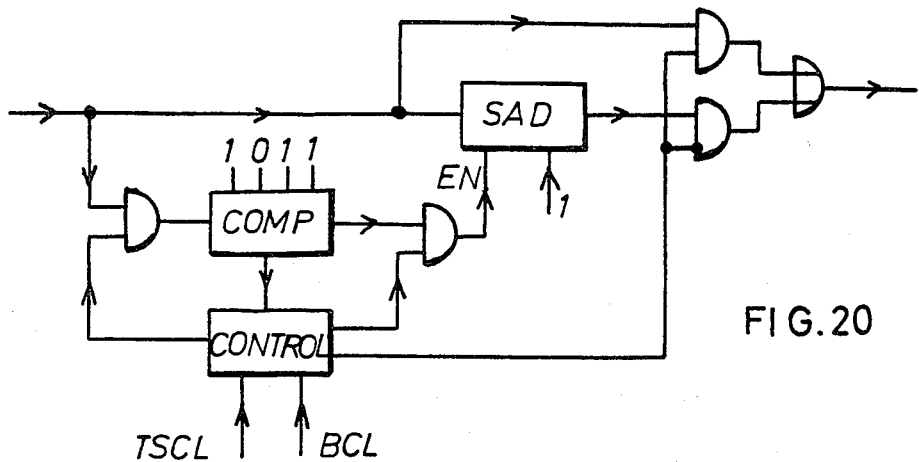
FIG. 20 shows the count unit.

In order to carry out the counting call process, which is required only in two-wire networks, a serial adder (FIG. 20) is used, which on arrival of a counting call time slot (FIG. 14) adds the value 1 to the bit sequence 7-20 by means of a SAD unit. To this end the TS identification (bits 3-6) is monitored synchronously with the time slot clock TSCL via the comparator COMP. If a counting call is present, the SAD unit adds the value 1 and this TS is transmitted via the gates instead of the unmodified TS. In the other case the upper gate remains open.

Figure 21:
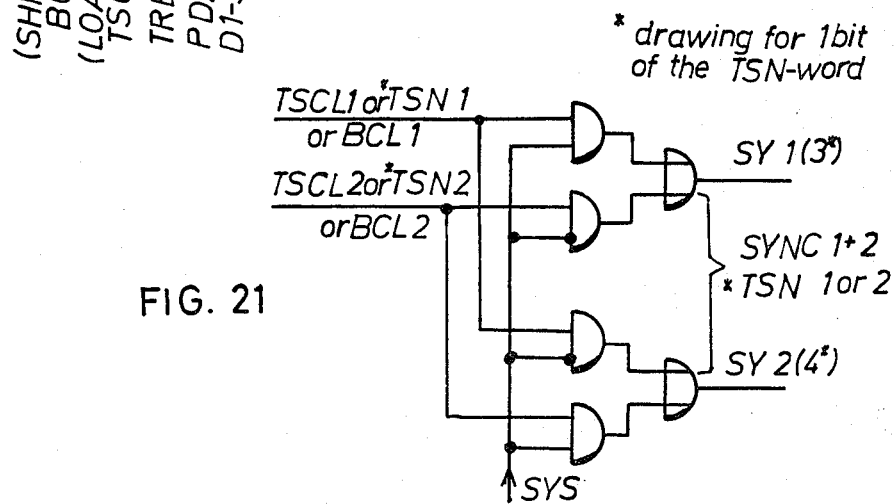
FIG. 21 shows the subscriber module synchronization switch.

The circuit of FIG. 21 is used to feed either clocks TSCL 1 and TSCL 2 or TSN 1 and TSN 2 to outputs SY 1, SY 2 or SY 3, SY 4. The clocks are used for switching the data CDP IN and CDP OUT, received and to be transmitted by the subscriber module, in the correct phase.

Figure 16:
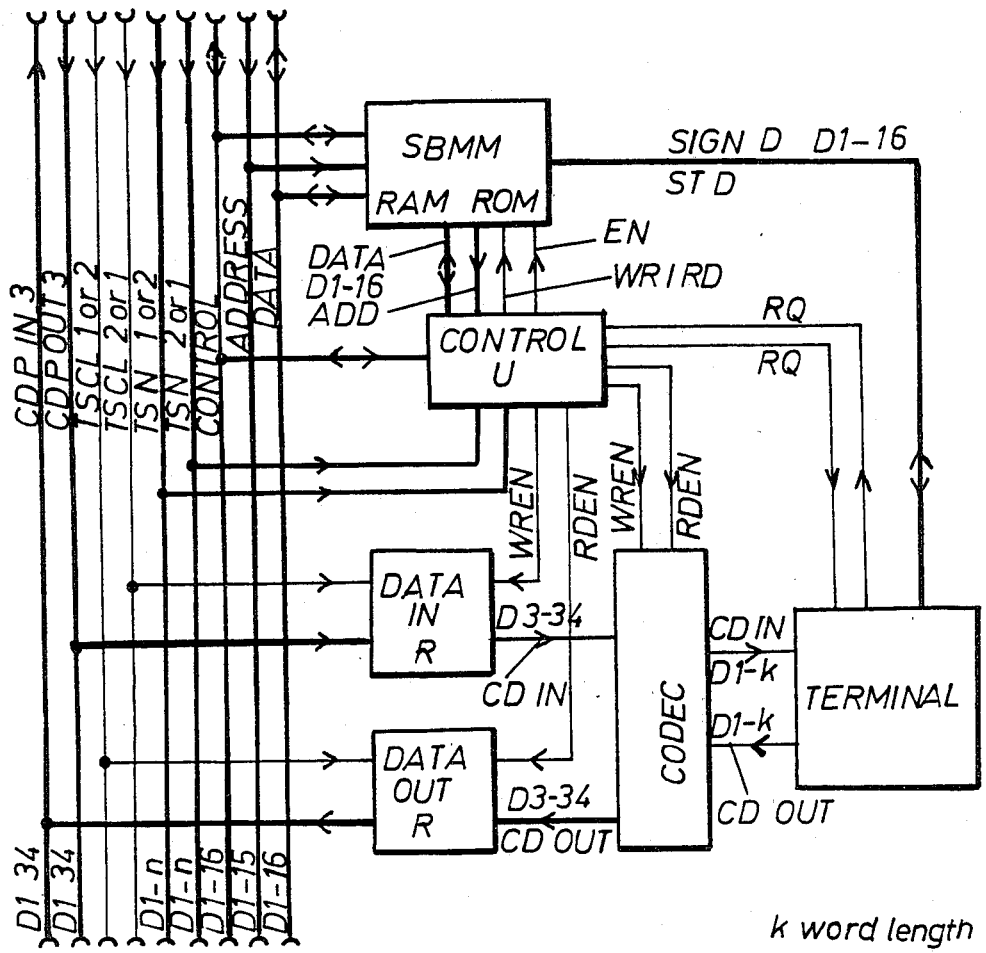
FIG. 16 shows the subscriber module.

The subscriber module which, together with the node, forms the subscriber station is shown in FIG. 16. Apart from the data lines CDP OUT, IN for the communication between the subscribers, the BUS system and the TSCL 1, 2 and TSN 1, 2 clocks are also set from the node to the subscriber module.

The necessary exchange of control information and data can take place via these connections. The CPU (FIG. 15) interrogates the SBMM memory (FIG. 16), which is provided with the current subscriber module data, for a request made by the unit via the CONTROL BUS. If, for example, the TERMINAL requests a connection, the subscriber address, the type of service and the terminal status is written into the subscriber module memory. Essentially, the node then carries out the signalling procedure and outputs a ready message after the connection has been established or broken down successfully. The node tells the module the time slot number which was used to switch the connection through. The end of connection is signalled to the node by the terminal via the module control unit.

The data received and to be transmitted are temporarily stored in the DATA IN, OUT registers (FIG. 16). The data are transferred between the registers and the terminal via a CODEC.

The subscriber station can be equipped with several subscriber modules via the connecting lines.

Table 1 specifies the signalling procedure for different possible cases.

The invention may be embodied in other specific forms without departing from the spirit or essential characteristics thereof. The embodiments are therefore to be considered in all respects as illustrative and not restrictive.

What is claimed is:

1. A digital time-division multiplex telecommunication system comprising:
   (a) a plurality of subscriber stations,
   (b) a plurality of standarized branching nodes,
   (c) a plurality of two-wire bidirectional transmission lines,
   (d) means for providing a plurality of fully synchronized time-division multiplex communication channels on said transmission lines, (e) means for coupling each of said branching nodes to at least two of said transmission lines, and
(f) means for coupling said subscriber stations to said branching nodes;
(g) said branching nodes comprising:
  (1) means for establishing a connection in at least one of said channels between a calling subscriber station and a called subscriber station, and
  (2) means for controlling establishing said connection whereby said connection occupies said channel only on said transmission lines between said calling station and said called station.

2. A digital time-division multiplex telecommunication system characterized by having channel occupancy during a connection only on transmission lines between communicating subscriber stations thereby allowing multiple use of individual channels within the system comprising:
  (a) a plurality of bidirectional two-wire transmission lines,
  (b) means for providing a plurality of time-division multiplex channels allocated in bidirectional pairs on said transmission lines,
  (c) means for synchronizing said multiplex channels,
  (d) a plurality of subscriber stations, and
  (e) a plurality of subscriber branching nodes for coupling said subscriber stations to said transmission lines whereby each of said subscriber stations is coupled to said transmission lines by an associated said subscriber branching node;
  (f) each of said subscriber stations comprising:
    (1) means for transmitting a call to initiate a connection with a called station,
    (2) means for transmitting a call answer to accept said connection with a calling station,
    (3) means for receiving a call,
    (4) means for transmitting messages, and
    (5) means for receiving messages;
  (g) each of said subscriber branching nodes comprising:
    (1) means for selecting a free channel,
    (2) means for sending said call transmitted by said associated calling station in said selected channel in both directions on said bidirectional transmission line,
    (3) means for monitoring said plurality of channels on said transmission line for said call from said calling station addressed to said associated station,
    (4) means for determining direction of arrival of said call on said bidirectional transmission line,
    (5) means for switching said call addressed to said associated station to said station,
    (6) means for sending said call answer transmitted by said associated station in said channel selected for said call on said transmission line only towards said calling station's direction,
    (7) means for determining direction of arrival of said call answer,
    (8) means for switching said call answer addressed to said associated station to said associated station,
    (9) means for sending said messages transmitted by said associated calling station in said selected channel only towards said called station on said transmission line,
    (10) means for sending said messages transmitted by said associated called stations in said selected channel only towards said calling station on said transmission line, and
    (11) means for switching said messages addressed to said associated station to said station and for clearing said selected channel whereby said messages occupy said selected channel only on said transmission lines between said calling station and said called station.

3. The system of claim 2 further characterized by having said bidirectional transmission lines and said branching nodes arranged in a ring network wherein:
  (a) said subscriber station further comprises means for transmitting a call with subscriber counting; and
  (b) said subscriber branching node further comprises:
    (1) means for incrementing said call with subscriber counting as said call passes said branching node,
    (2) means for determining the shortest route between said calling station and said called station from said call with subscriber counting in said selected allocated channel pair on said bidirectional transmission line, and
    (3) means for establishing said connection between said called station and said calling station having the shortest route on said transmission lines.

4. The system of claim 2 further characterized by having said system arranged in a branching network wherein:
  (a) each of said branches includes at least one two-wire bidirectional transmission line comprising at least one line network branching node for interconnecting three branches;
  (b) said line branching node comprising:
    (1) means for determining the occupancy status of each of said plurality of channels arriving at said line network branching node,
    (2) means for marking as occupied a first channel if a second channel forming said allocated pair with said first channel is occupied by said call, and
    (3) means for directing an arriving occupied channel in which said connection between said calling station and said called station has been established only to said branch containing a portion of said transmission line located between said calling station and said called station.

5. The system of claim 4 further characterized by having said branching network arranged in a star network comprising a central branching node:
  (a) said central branching node comprising a plurality of module means with one of said module means allocated to each of said branches in said star network for controlling the switching of said channels between said branches; and
  (b) said module means comprising:
    (1) a plurality of said line network nodes having one of said branches of each assigned to said allocated branch in said star network wherein said arriving channels are directed to all of said line network nodes of said assigned branch and said channels of said allocated pairs are combined in an OR gate to form an outgoing plurality of channels,
    (2) a node control means for insuring that each of said connections is only connected through one of said transmission lines; and
    (3) means for coupling said module means together whereby a plurality of simultaneous connections can be switched through without blockage.

6. The system of claim 2 wherein said subscriber branching node further comprises:
(a) means for selecting a plurality of free channels; and
(b) means for sending said call transmitted by said associated station in each of said plurality of selected channels.

7. The system of claim 2 wherein said subscriber station further comprises means for disconnecting said connection between said called station and said calling station.

8. The system of claim 2 wherein said subscriber station further comprises means for measuring and storing the time duration of said connections.

9. The system of claim 2 wherein said subscriber station further comprises means for transmitting a signal indicating an occupied status in response to said call.

* * * * *